INVENTOR.
THOMAS KLEIN
BY
AGENT

INVENTOR.
THOMAS KLEIN

BY

AGENT

United States Patent Office 3,436,279
Patented Apr. 1, 1969

3,436,279
PROCESS OF MAKING A TRANSISTOR WITH AN INVERTED STRUCTURE
Thomas Klein, Horley, England, assignor to North American Philips Company, Inc., New York, N.Y., a corporation of Delaware
Filed Dec. 16, 1964, Ser. No. 418,696
Claims priority, application Great Britain, Dec. 17, 1963, 49,770/63
Int. Cl. H01l 7/44, 7/46
U.S. Cl. 148—175
4 Claims

ABSTRACT OF THE DISCLOSURE

A process of making an inverted epitaxial transistor starting with a substrate containing both types of impurities with one type predominating. An epitaxial layer containing a smaller concentration of said one type impurity is vapor deposited on the body, under such conditions as to cause the opposite type impurity in the body to diffuse outwardly into the epitaxial layer but only for a distance less than the whole thickness of the layer to convert an interior portion of the epitaxial layer to the opposite type conductivity. The surface portion of the epitaxial layer remains unconverted and thus of one type conductivity. Thus, two p-n junctions are established in the structure defining three regions alternating in conductivity type. Next, connections are made to the original body to form an emitter, to the converted interior portion to form a base, and to the unconverted epitaxial portion to form a collector, so that in operation the collector junction becomes back biased to collect carriers, and the emitter junction becomes forward biased to inject carriers into the base region to be collected by the collector.

---

The invention relates to a method of manufacturing transistors, particularly intended for use in solid circuits in which a semiconductor body is provided not only with a transistor but also with a further circuit element, said transistor comprising three consecutive zones of alternating conductivity type, i.e., two outer zones and one intermediate zone, in which on one side of a semiconductor body, which body constitutes itself one of the outer zones, there are arranged the other outer zone and the intermediate zone.

Transistors of this kind may be mesa transistors and planar transistors.

With such known methods a semiconductor body which itself constitutes the collector zone is provided at one side with the emitter zone and the base zone. In many cases it is desirable, however, for the semiconductor body to form itself the emitter zone, whereas the collector zone and the base zone are provided at one side of said body, for example because it is advantageous to connect the emitter zone through the semiconductor body to the further circuit element. A transistor in which the semiconductor body itself can operate as an emitter zone can be manufactured, however, only with difficulty, since it is desirable that the base zone, which in known transistors may be a diffused zone, would exhibit a variation in the concentration of the impurity determining the conductivity type, said concentration in the vicinity of the emitter zone being higher than that in the vicinity of the collector zone.

The invention has for its object inter alia to provide an advantageous method of manufacturing a transistor, in which the semiconductor body itself, which is used as the starting material, can operate effectively as the emitter zone of the transistor to be made.

According to the invention a method of the kind set forth is characterized in that an epitaxial semiconductor layer is grown on a surface of a semiconductor body by the deposition of semiconductor material doped with an impurity of one conductivity type, the semiconductor body containing, at least in the proximity of said surfaces, an impurity of the opposite conductivity type, which is diffused from the semiconductor body into the epitaxial layer, a configuration being thus obtained in which the other outer zone is formed by a portion of one conductivity type of the epitaxial layer, the intermediate zone is formed at least partly by the part of the epitaxial layer which has assumed the opposite conductivity type by the diffusion and the one outer zone is formed by at least a portion of one conductivity type of the semiconductor body adjacent the intermediate zone, said portion having a lower resistivity than the other outer zone.

Use is preferably made of a semiconductor body which is completely of one conductivity type, whereas an impurity of the opposite type may be introduced into the semiconductor body by diffusion.

Important embodiments are characterized in that the semiconductor body is provided not only with a transistor but also with a further circuit element, for example a further transistor, a resistance element and/or a capacitor.

It is found to be particularly advantageous to provide the intermediate zone with an electric contact by overdoping part of the other outer zone from the surface of the epitaxial layer up to the intermediate zone, said part being surrounded by the part of the other outer zone which is not overdoped. The contact may be applied so that an unchanged part of the other outer zone is surrounded by the overdoped part. Overdoping may be carried out by diffusion of a suitable impurity through an opening provided in an oxide layer, which is provided on the surface of the epitaxial layer and of the body.

The epitaxial layer is preferably divided into different portions and each portion being used to form an electric circuit element. The impurity of the other conductivity type in the semiconductor body may also be provided in a number of discreet portions, so that diffusion takes place in the corresponding discreet portions of the epitaxial layer.

A connection between the transistor and a further circuit element may be obtained by means of a conducting layer on an insulating layer, which may be an oxide layer.

A resistance element may be provided, the resistance body of which is formed by the part of one conductivity type of the epitaxial layer. A direct conducting connecting is then preferably established between the intermediate zone below the resistance body and the one outer zone.

An insulating layer is advantageously applied to the epitaxial layer on layer portions and to free surface portions of the semiconductor body, while electric connections to circuit elements are obtained by applying conducting layers on the insulating layer, said layers being connected through openings in the insulating layer to the circuit elements.

It may be very advantageous to provide two conducting, crossing connections, which are insulated from the body and from the epitaxial layer by an insulating layer and from each other by an insulating layer, one of the crossing connections including a part of the epitaxial layer located below the other conducting connection.

An electric connection may be established with the one outer zone from the side of the body opposite the side where the epitaxial layer is applied.

The body and the epitaxial layer may consist of silicon and the impurity of one type may be formed by arsenic as a donor and the impurity of the opposite type may be formed by boron as an acceptor.

The invention furthermore relates to a transistor manufactured by a method according to the invention.

Examples of the method according to the invention will now be described more fully with reference to the accompanying drawing.

FIG. 7 is a cross sectional view taken on the line VII—VII in FIG. 8, which shows a plan view.

Figure 1:
FIGS. 1 and 3 to 7 show cross sectional views of a semiconductor body in various stages of the manufacture of a semiconductor device by the method according to the invention.

In the cross sections of the drawing shading is omitted for the sake of clarity.

FIG. 1 shows a semiconductor body 1 formed by a rectangular die of dimensions of $200\mu \times 6000\mu \times 1000\mu$. The n-type body 1 is doped with about $3 \times 10^{19}$ atoms/ccm. of arsenic and about $1 \times 10^{19}$ atoms/ccm. of boron.

Figure 3:
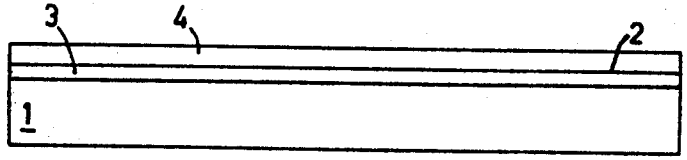

The body 1 of FIG. 3 is provided with an epitaxial surface layer 2 of weak n-type conductivity. After the epitaxial application of silicon with about $2 \times 10^{17}$ atoms/ccm. of arsenic, the layer 2 has a zone 3 of a thickness of about $1\mu$ of p-type conductivity, in which boron diffused from the body 1 predominates and a zone 4 having the n-type conductivity of the epitaxially applied material.

Figure 4:
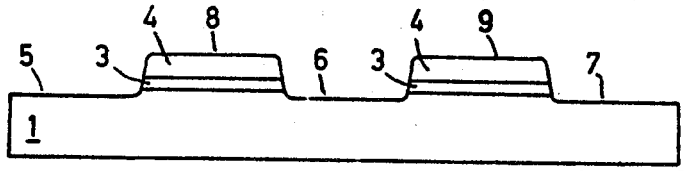

A masking layer of etching-resistant material (not shown) is applied to the body 1 and the layer 2, after which the body 1 and the layer 2 are etched so that after the removal of the resist layer the stage of FIG. 4 is attained, in which the volumes 5, 6 and 7 are removed and two mesas 8 and 9 are formed, which each include a discreet part of the layer 2 with the zones 3 and 4.

Figure 5:
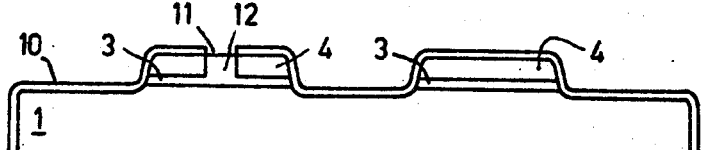
Figure 6:
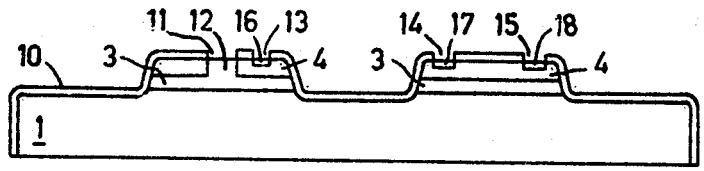

A silicon oxide layer 10 is applied as is indicated in FIG. 5 by heating in an atmosphere of wet oxygen at a temperature of about 860° C. for 16 hours, after which an opening 11 is made with the aid of a photoresist and by etching in the layer 10. Aluminum is applied through a mask by vapour deposition in vacuo to the n-type silicon surface, after which by diffusion and alloying the p-type contact 12 with the p-type zone 3 is obtained. The diffusion and the alloying processes are carried out by heating at about 1150° C. for one hour.

Three further openings 13, 14 and 15 are then provided by etching in the layer 10, as is shown in FIG. 5. The opening 13 forms part of a ring and the openings 14 and 15 are elongated, parallel rectangles. Gold with 0.5 to 1% by weight of antimony (or gold with 0.5 to 1% by weight of arsenic) is then applied by vapour deposition through a mask and alloyed to the zone 4 by heating at 400° C. or higher for a short time, so that substantially ohmic contacts 16, 17 and 18 are formed with the zones 4. As an alternative a metal layer may be provided in an opening in the oxide layer by coating the whole oxide layer together with the openings with a metal layer and by subsequently removing the metal layer with the aid of a photoresist and an etchant except for the places of the openings.

Figure 7:
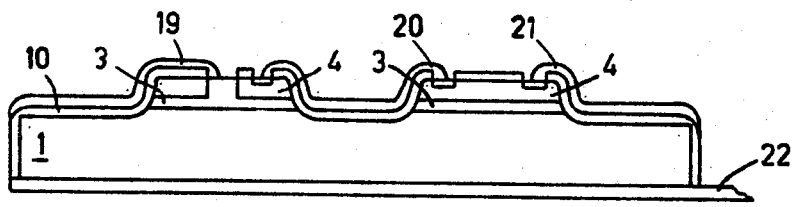

Vapour-deposited metal layers 19, 20 and 21 are applied as is shown in FIG. 7 by vapour-deposition of aluminum or with the aid of a mask or with the aid of a photolythographic technique in order to obtain a connection to the contact 12, to interconnect the contacts 16 and 17 and to obtain a connection to the contact 18. The lower side of the body 1 is alloyed onto a gold-plated Kovar-strip 22.

Figure 8:
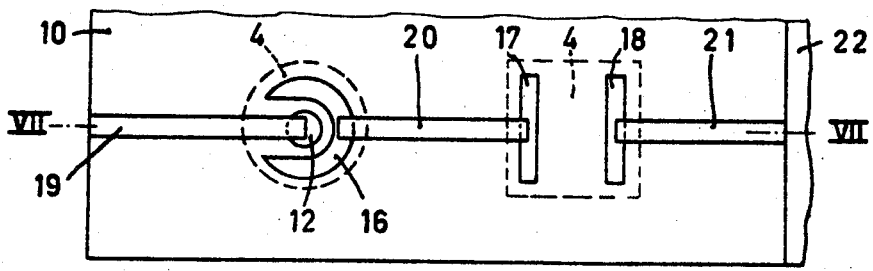

FIG. 8 is a plan view corresponding to the cross sectional view of FIG. 7, while the boundaries of the mesas 8 and 9 below the oxide layer 10 are indicated by broken lines. It will be apparent that the mesa resistor has a rectangular resistance body and that the contacts 17 and 18 are elongated, parallel rectangles. This permits of obtaining a satisfactorily reproduceable resistance value with great accuracy.

When the resistor has to be used under conditions under which the break-down voltage between the zone 4 and the semiconductor body 1 might be reached or even transgressed, while the zone 3 is short-circuited and hence the voltage thereof is floating, a direct electric connection may be established by means of a metal layer between the zone 3 and the body 1. The connection may be obtained for example by applying a contact equal to the contact 12 on the right-hand side of the contact 18 of FIG. 7 and by establishing an electric connection between this contact and the body 1 with the aid of a conducting layer on the oxide layer, said layer being provided through an opening in the oxide layer 10 on the right-hand side of the mesa 9 of FIG. 7 and the body 1. This connection is not shown in the figure.

Figure 2:
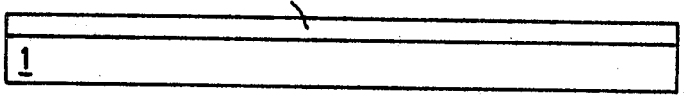
FIG. 2 is a cross sectional view of a semiconductor body during the manufacture of a semiconductor device by another method according to the invention.

FIG. 2 shows a variant of a starting body 1 in which the boron is restricted to a surface layer 1b of the initially completely n-type conducting body 1. This body provides a result like that shown in FIGS. 7 and 8 by using the same steps as described above with reference to FIGS. 3 to 8. The boundaries of the zone 1b are not indicated in FIGS. 3 to 7.

Figure 9:
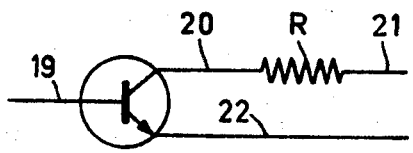
FIG. 9 shows a circuit arrangement of the device.

FIG. 9 shows a circuit arrangement for the device of FIGS. 7 and 8. One end of a resistor R corresponding to the layer 4 between the contacts 17 and 18 is connected by a layer 20 to the collector of the transistor, since the p-n junction between the body 1 and the zone 3 in the above method is a more active emitter than the p-n junction between the zones 3 and 4. A connection 19 is provided for the base and the connection 21 with the other end of the resistor R and the connection 22 serves for the emitter. As is usual in these circuits, the collector is biased in the reverse direction, and the emitter gets biased in the forward direction to obtain transistor action.

Figure 10:
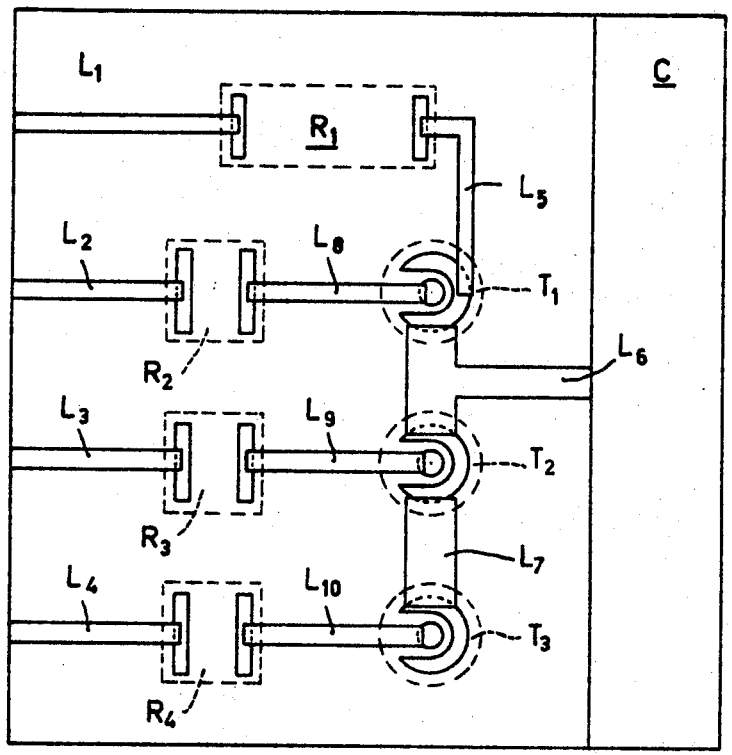
FIG. 10 is a plan view and FIG. 11 shows the corresponding circuit diagram of another device obtained by a method according to the invention.
Figure 11:
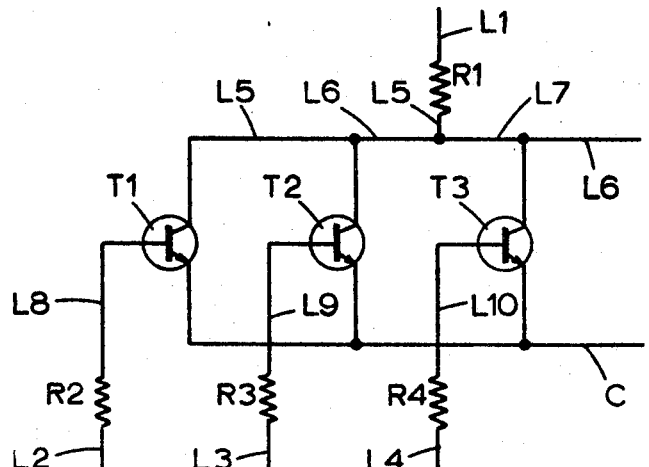

FIG. 10 shows a more complex device comprising three transistors and four resistors which with the exception of the provision of openings in the oxide layer and of metal layers are obtained by a method similar to that described with reference to FIGS. 1 to 9. FIG. 11 shows the circuit arrangement for the device of FIG. 10, which is suitable for use as an or-gate circuit.

The device comprises four resistors R1, R2, R3, R4 and three transistors T1, T2, T3. Metal layers L1, L2, L3, L4 provide the external connections to one end of the resistors R1, R2, R3 and R4 respectively and the layer L5 connects the other end of the resistor R1 to the collector of the transistor T1, the layer L6 connects the collectors of the transistors T1 and T2 to each other and supplies a common external connection to the collectors of the transistors T1, T2 and T3, the layer L7 connects the collectors of the transistors T2 and T3 to each other and the layers L8, L9, and L10 connect each of the other ends of the resistors R2, R3, R4 to the base of the transistors T1, T2 and T3 respectively. A common emitter connection is obtained by means of a gold-plated Kovar strip C, alloyed onto the lower surface of the body 1. FIG. 10 shows a projecting part of the strip C. In operation the layer L1 may be connected to a voltage of +3 v. and the strip C to earth.

Figure 12:
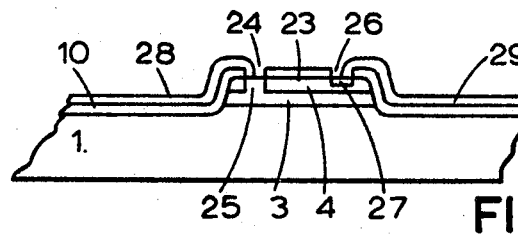
FIGS. 12 and 13 are cross sectional views of parts of devices manufactured by a method according to the invention, which parts include circuit elements.

FIG. 12 shows a capacitor in a stage of manufacture corresponding to that of FIGS. 7 and 8. A connection is established with the zone 3 and one with the zone 4 so that the capacitive effect of a space charge region in the proximity of the p-n junction 3–4 in operation may be utilised: A mesa 23 is obtained by etching. An oxide layer 10 and an opening 24 are provided. Aluminum is alloyed onto the silicon surface through the opening 24 in order to obtain a p-type contact 25 on the zone 3. A second opening 26 is provided in the oxide layer and gold-arsenic is alloyed onto the silicon surface in the opening 26 in order to obtain an n-type contact 27. Metal layers 28 and 29 are provided and connected to the contacts 25 and 27. The capacitor is connected to a transistor (not shown) and the body 1 is then common to the capacitor and the transistor. Corresponding manufacturing steps are preferably carried out in a single operation. The contact 25 may therefore be applied simultaneously with the contact 12 on the transistor. The zone 3 may be connected to the body 1 in the manner as described above for the resistor R, obtained by the mesa 4.

Figure 13:
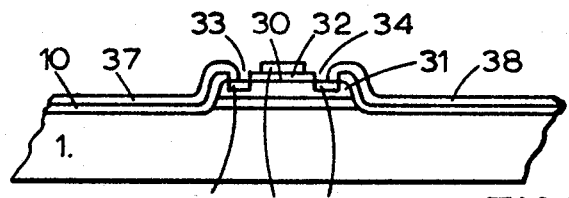

FIG. 13 shows a crossing of two relatively insulated connections in a manufacturing stage corresponding to that of FIGS. 7 and 8. A mesa 30 is obtained by etching. An oxide layer 10 and an opening over substantially the whole upper surface of the mesa 30 are provided. Phosphorus is applied in the opening and diffused into the silicon surface by heating at 1150° C. for one hour in order to obtain a surface layer 31 with a low resistivity. An oxide layer 32 is then grown on the surface layer 31 and two openings 33 and 34 are made therein. Gold-arsenic is alloyed in the openings 33 and 34 in order to obtain contacts 35 and 36 on the layer 31. Metal layers 37 and 38 connected with the contacts 35 and 36 are provided and a metal layer 39 is provided at right angles to the plane of the drawing. The current path 37, 35, 31, 36, 38, has a low resistance and the metal layer 39 crosses this current path and is insulated therefrom by the oxide layer 32, so that a crossing of conducting connections is obtained. The crossing forms part of a set of conducting connections to a transistor (not shown) and other circuit elements. The zone 3 may be connected to the body 1 in the manner described above for the resistor R formed by the mesa 4. If possible, a number of manufacturing steps are carried out in a single operation. The contacts 35 and 36 may, for example, be applied simultaneously with the contact 16 of the transistor.

Instead of conducting metal layers, solder wires may be used for establishing electric connections.

Figure 14:
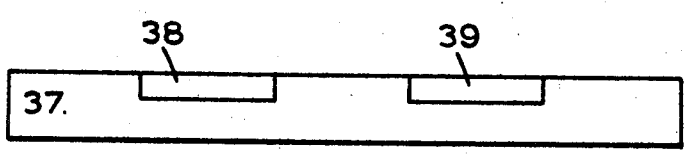
FIGS. 14 to 16 are cross sectional views of a semiconductor body in various stages of the manufacture of a semiconductor device by a further method according to the invention.

In the embodiments described above either the whole body 1 or a whole surface layer of the body 1 is doped with the impurity to be diffused into the epitaxial layer. As an alternative, only parts of the surface layer of the body 1, where the epitaxial layer is grown, may be doped with the impurity to be diffused into the epitaxial layer. Then only local diffusion takes place in the epitaxial layer. As is shown in FIG. 14 an arsenic doped n-type body 37, which comprises discrete volumes 38 and 39 wherein boron is diffused may be used instead of the body 1.

Figure 15:
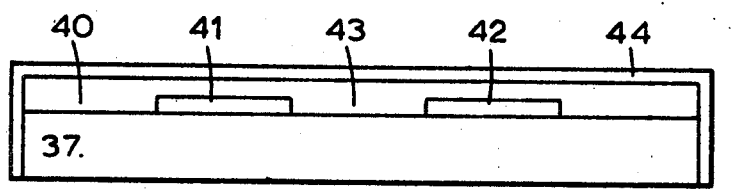
Figure 16:
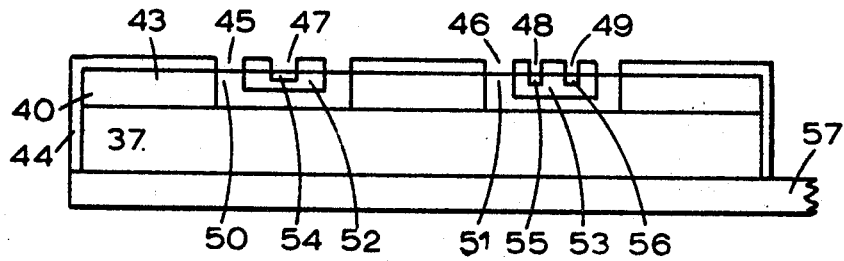
Figure 17:
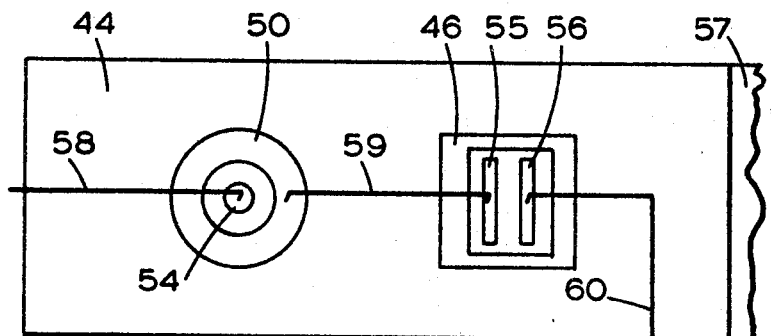
FIG. 17 is a plan view of the part shown in FIG. 16 in a cross sectional view.

In this case it is not necessary to etch mesas, since, if the epitaxial layer (weak n-type) is provided and boron is diffused into the epitaxial layer 40 (see FIG. 15), two discreet p-type zones 41 and 42 are obtained in the layer 40, while the conductivity type of the zone 43 in the layer 40 is not affected by the diffusion of arsenic. The zones 38 and 39 are left. They are not shown in FIG. 14, since the body 37 maintains the n-type conductivity. An oxide layer 44 is applied to the body 1 and the layer 40 as is shown in FIG. 15. The FIGS. 16 and 17 show the almost complete and the complete device respectively comprising a transistor and a resistor, which may be connected like the arrangement shown in FIG. 9. Two openings 45 and 46, an opening 47 and two rectangular elongated parallel openings 48 and 49 are provided in the layer 44. After the openings 45 and 46 are provided, aluminum is alloyed in the manner described above to the n-type silicon surfaces and diffused into the zone 43 in order to obtain two p-type connections 50 and 51 with the zones 41 and 42, and discrete n-type zones 52 and 53. Then the openings 47, 48 and 59 are provided, after which gold-antimony is alloyed to the zones 52 and 53 in order to obtain contacts 54, 55 and 56. Conducting connections are denoted by 58, 59 and 60.

The resistance body 53 is insulated by a surrounding zone 51 from the remainder of the semiconductor body and the epitaxial layer.

This insulation may also be obtained by removing the zone 43 at a place which is located between the transistor and the resistance body. Thus a mesa is not obtained, but the transistor and the resistance body are thus separated electrically from each other, so that only the desired connections are left.

Other circuit elements such as capacitors and further crossing connections may be provided with the aid of similar methods as described with reference to FIGS. 12 and 13.

What is claimed is:

1. A method of making a transistor comprising at least three consecutive zones alternating in conductivity type, comprising the steps of:
    (1) providing a semiconductive body having at least one surface region containing both one-type-conductivity-forming impurities and opposite-type-conductivity-forming impurities with said one-type-conductivity-forming impurities dominating said body surface region which thereby exhibits said one type of conductivity,
    (2) vapor depositing on the body surface containing said surface region an epitaxial layer containing said one-type-conductivity-forming impurities but in a smaller concentration than the concentration of said one-type-conductivity-forming impurities in said body surface regions,
    (3) subjecting said body to conditions of temperature and time such that said opposite-type-conductivity-forming impurities in said body surface region diffuse outwardly from the body into the adjacent portions of the epitaxial layer to convert an interior portion only of the epitaxial layer into said opposite type of conductivity forming an emitter p-n junction with said body surface region while leaving an unconverted surface portion of the epitaxial layer of said one type of conductivity forming a collector p-n junction with the converted interior portion, the unconverted epitaxial surface portion of one type of conductivity having a higher resistivity than that of said body surface region of said one type of conductivity, said converted interior portion containing a concentration gradient of said opposite-type-conductivity-forming impurities which decreases in a direction from the emitter junction to the collector junction,
    (4) and making electrical connections to the body surface region as an emitter, to the converted interior portion as a base, and to the unconverted epitaxial surface portion as a collector whereby the collector junction can be biased in the reverse direction and the emitter in the forward direction to effect transistor action.

2. A method as set forth in claim 1 wherein the opposite type-conductivity-forming impurities are initially provided in the semiconductive body by diffusion from said surface.

3. A method as set forth in claim 1 wherein a further electric circuit element is formed by diffusion in an adjacent region of said epitaxial layer, said further electric circuit element being internally connected through the semiconductor body to the said transistor emitter.

4. A method as set forth in claim 1 wherein the converted interior portion is contacted by converting a surface-connected center portion only of the unconverted epitaxial surface portion into said opposite type of conductivity by introducing impurities therein.

References Cited

UNITED STATES PATENTS

| | | | |
|---|---|---|---|
| 3,089,794 | 5/1963 | Marinace | 148—175 |
| 3,149,395 | 9/1964 | Bray et al. | 148—175 |
| 3,189,973 | 6/1965 | Edwards et al. | 148—175 |
| 3,260,624 | 7/1966 | Wiesner | 148—174 |
| 3,260,902 | 7/1966 | Porter | 148—175 |
| 3,244,950 | 4/1966 | Ferguson | 148—1.5 XR |

L. DEWAYNE RUTLEDGE, *Primary Examiner.*

P. WEINSTEIN, *Assistant Examiner.*

U.S. Cl. X.R.

29—577; 148—186, 187; 156—17